(12) United States Patent
Ito et al.

(10) Patent No.: US 12,301,072 B2
(45) Date of Patent: May 13, 2025

(54) MOTOR-DRIVEN COMPRESSOR

(71) Applicant: KABUSHIKI KAISHA TOYOTA JIDOSHOKKI, Kariya (JP)

(72) Inventors: Shun Ito, Kariya (JP); Yoshiki Nagata, Kariya (JP); Takashi Kawashima, Kariya (JP); Hiroshi Fukasaku, Kariya (JP); Shunsuke Ambo, Kariya (JP); Kazuhiro Shiraishi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 305 days.

(21) Appl. No.: 18/166,844

(22) Filed: Feb. 9, 2023

(65) Prior Publication Data

US 2023/0268811 A1  Aug. 24, 2023

(30) Foreign Application Priority Data

Feb. 22, 2022 (JP) ................. 2022-025962

(51) Int. Cl.
| | |
|---|---|
| *H02K 11/33* | (2016.01) |
| *F04C 29/00* | (2006.01) |
| *H02K 3/16* | (2006.01) |
| *H02P 27/06* | (2006.01) |

(52) U.S. Cl.
CPC .......... *H02K 11/33* (2016.01); *F04C 29/0085* (2013.01); *H02K 3/16* (2013.01); *H02P 27/06* (2013.01); *F04C 2240/40* (2013.01)

(58) Field of Classification Search
CPC ....... H02K 11/33; H02K 3/16; F04C 18/0215; F04C 2240/40; F04C 2240/403; F04C 2240/808; F04C 23/008; F04C 29/0085; F04C 29/06; H02P 27/06; H02P 6/00; G06V 40/103; G06V 40/25; G01S 13/46; G01S 13/58; G01S 13/589; G01S 13/931; G01S 2013/93271; G01S 7/415; G01S 13/50; G01S 13/62
See application file for complete search history.

(56) References Cited

U.S. PATENT DOCUMENTS

| | | | |
|---|---|---|---|
| 2018/0194200 A1* | 7/2018 | Ambo | .................. F04B 39/121 |
| 2018/0198350 A1* | 7/2018 | Ambo | .................. H03H 7/0115 |

FOREIGN PATENT DOCUMENTS

| | | |
|---|---|---|
| JP | 2007-214789 A | 8/2007 |
| JP | 2007-235580 A | 9/2007 |
| JP | 2019-180218 A | 10/2019 |

* cited by examiner

*Primary Examiner* — Naishadh N Desai
(74) *Attorney, Agent, or Firm* — Sughrue Mion, PLLC (57) ABSTRACT

A motor-driven compressor includes an inverter device. The inverter device includes a noise reducing unit. The noise reducing unit includes common-mode choke coils and a smoothing capacitor. The common-mode choke coils include a first coil and a second coil. The first coil includes a first core, a first winding, and a second winding. The first core includes a first straight portion and a second straight portion. The second coil includes a second core, a third winding, and a fourth winding. The second core includes a third straight portion and a fourth straight portion. The first coil and the second coil are arranged side by side such that a current flowing through the first winding and the third winding generates an annular magnetic flux that passes through both of the first straight portion and the third straight portion.

5 Claims, 9 Drawing Sheets

MOTOR-DRIVEN COMPRESSOR

BACKGROUND

1. Field

The present disclosure relates to a motor-driven compressor.

2. Description of Related Art

A motor-driven compressor includes a compression unit, an electric motor, and an inverter device. The compression unit compresses a fluid. The electric motor drives the compression unit. The inverter device drives the electric motor. The inverter device includes an inverter circuit. The inverter circuit converts DC power into AC power. The inverter device includes a noise reducing unit. The noise reducing unit is arranged on the input side of the inverter circuit. The noise reducing unit includes common-mode choke coils and a smoothing capacitor. The smoothing capacitor is included in a low-pass filter circuit together with the common-mode choke coils. The noise reducing unit reduces common-mode noise and normal-mode noise included in the DC power before being input to the inverter circuit.

The common-mode choke coils each include an annular core, a first winding, and a second winding. The windings are wound around the annular core. The second winding is wound around the annular core at a position away from the wound first winding so as to face the first winding. Japanese Laid-Open Patent Publication No. 2019-180218 discloses a common-mode choke coil that includes an annular conductor. The annular conductor extends over and surrounds a first winding and a second winding. In this case, a normal-mode current through the core induces a current in the conductor. The induced current in the conductor generates a magnetic flux in the conductor that resists a leakage flux generated during energization with the normal-mode current. The induced current in the conductor is converted into thermal energy, so that the conductor acts as a magnetic resistance, thereby producing a damping effect. This suppresses a resonance peak generated by the low-pass filter.

Such a motor-driven compressor is desired to improve the damping effect.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a motor-driven compressor includes a compression unit configured to compress a fluid, an electric motor configured to drive the compression unit, and an inverter device configured to drive the electric motor. The inverter device includes an inverter circuit configured to convert DC power to AC power, and a noise reducing unit that is provided on an input side of the inverter circuit and is configured to reduce common-mode noise and normal-mode noise included in the DC power before the DC power is supplied to the inverter circuit. The noise reducing unit includes common-mode choke coils and a smoothing capacitor that is included in a low-pass filter circuit together with the common-mode choke coils. The common-mode choke coils include a first coil and a second coil. The first coil includes an annular first core, a first winding wound around the first core, a second winding that is wound around the first core at a position away from the first winding so as to face the first winding, and an annular first conductor that extends over and surrounds the first winding and the second winding. The first conductor includes two regions respectively covering two openings of a first hole inside the first core. The two regions are opposed to each other with the first hole between them. The first core includes a first straight portion and a second straight portion. The first straight portion extends linearly. At least a part of the first winding is wound around the first straight portion. The second straight portion extends parallel with the first straight portion. At least a part of the second winding is wound around the second straight portion. The second coil includes an annular second core, a third winding wound around the second core, a fourth winding that is wound around the second core at a position away from the third winding so as to face the third winding, and an annular second conductor that extends over and surrounds the third winding and the fourth winding. The second conductor includes two regions respectively covering two openings of a second hole inside the second core. The two regions are opposed to each other with the second hole between them. The second core includes a third straight portion and a fourth straight portion. The third straight portion extends linearly. At least a part of the third winding is wound around the third straight portion. The fourth straight portion extends parallel with the third straight portion. At least a part of the fourth winding is wound around the fourth straight portion. The first winding and the third winding are electrically connected to each other. The second winding and the fourth winding are electrically connected to each other. The first coil and the second coil are arranged side by side such that a current flowing through the first winding and the third winding generates an annular magnetic flux that passes through both of the first straight portion and the third straight portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

The term "annular" as used in this description may refer to any structure that forms a loop, or a continuous shape with no ends.

A motor-driven compressor 11 according to one embodiment will now be described with reference to FIGS. 1 to 6. The motor-driven compressor 11 of the present embodiment is used, for example, in a vehicle air conditioner 10.

<Vehicle Air Conditioner 10>

Figure 1:
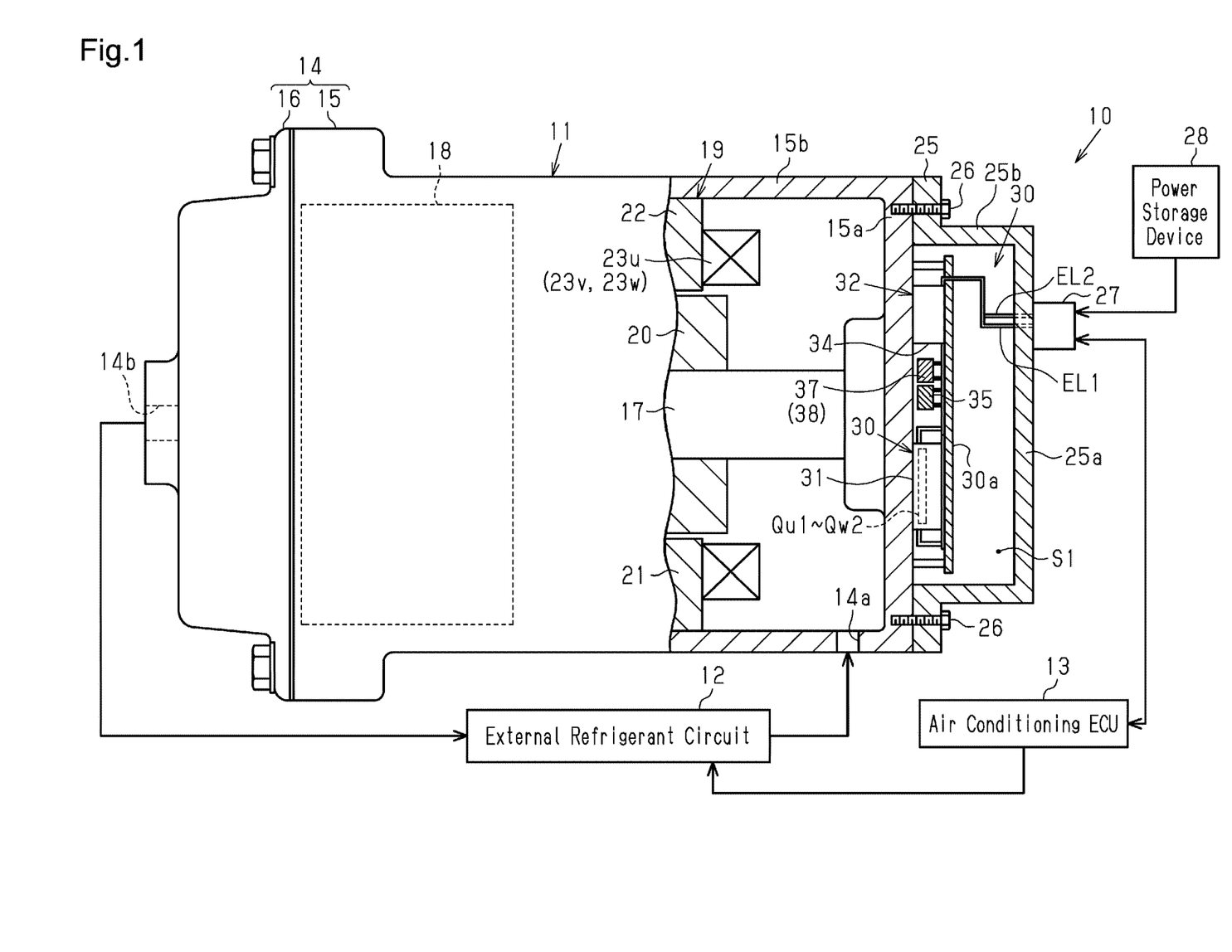
FIG. 1 is a cross-sectional view of a motor-driven compressor according to an embodiment.

As shown in FIG. 1, the vehicle air conditioner 10 includes the motor-driven compressor 11 and an external refrigerant circuit 12. The external refrigerant circuit 12 supplies fluid, which is refrigerant, to the motor-driven compressor 11. The external refrigerant circuit 12 includes, for example, a heat exchanger and an expansion valve. The motor-driven compressor 11 compresses the refrigerant. Also, the external refrigerant circuit 12 performs heat exchange of the refrigerant and expands the refrigerant. This allows the vehicle air conditioner 10 to cool or warm the passenger compartment.

The vehicle air conditioner 10 includes an air conditioning ECU 13. The air conditioning ECU 13 controls the entire vehicle air conditioner 10. The air conditioning ECU 13 is configured to obtain parameters such as the temperature in the passenger compartment and a target temperature of a car air conditioner. Based on parameters such as the temperature in the passenger compartment and the target temperature of the car air conditioner, the air conditioning ECU 13 outputs various commands such as ON-OFF commands to the motor-driven compressor 11.

<Motor-Driven Compressor 11>

The motor-driven compressor 11 includes a housing 14. The housing 14 is made of a thermally conductive metal, such as aluminum. The housing 14 is grounded to the body of the vehicle.

The housing 14 includes a suction housing member 15 and a discharge housing member 16. The suction housing member 15 and the discharge housing member 16 are assembled together. The suction housing member 15 includes a plate-shaped end wall 15a and an annular peripheral wall 15b. The peripheral wall 15b extends from the outer periphery of the end wall 15a. The discharge housing member 16 is attached to the suction housing member 15 so as to close the opening of the suction housing member 15. Accordingly, an internal space is defined in the housing 14.

The housing 14 includes a suction port 14a. Refrigerant is drawn into the suction port 14a from the external refrigerant circuit 12. The suction port 14a opens in the peripheral wall 15b of the suction housing member 15. Specifically, the suction port 14a opens in a section of the peripheral wall 15b of the suction housing member 15 that is closer to the end wall 15a than to the discharge housing member 16. The housing 14 includes a discharge port 14b. The discharge port 14b discharges refrigerant to the external refrigerant circuit 12. The discharge port 14b opens in the discharge housing member 16.

The motor-driven compressor 11 includes a rotary shaft 17, a compression unit 18, and an electric motor 19. The rotary shaft 17, the compression unit 18, and the electric motor 19 are accommodated in the housing 14. The rotary shaft 17 is rotatably supported by the housing 14. The rotary shaft 17 is accommodated in the housing 14 such that the axial direction of the rotary shaft 17 agrees with the axial direction of the peripheral wall 15b.

<Compression Unit 18>

The compression unit 18 is accommodated in the suction housing member 15. The compression unit 18 is of a scroll type and includes a fixed scroll (not shown), which is fixed in the suction housing member 15, and an orbiting scroll (not shown), which is opposed to the fixed scroll. In the suction housing member 15, the compression unit 18 is disposed at a position closer to the discharge port 14b than to the suction port 14a. The compression unit 18 is coupled to the rotary shaft 17. The compression unit 18 is driven by rotation of the rotary shaft 17 to compress the refrigerant.

<Electric Motor 19>

The electric motor 19 is accommodated in the suction housing member 15. The electric motor 19 is arranged in the suction housing member 15 between the compression unit 18 and the end wall 15a. The electric motor 19 includes a rotor 20 and a stator 21. The stator 21 includes a cylindrical stator core 22 and three-phase coils 23u, 23v, 23w.

The three-phase coils 23u, 23v, 23w are respectively wound around the stator core 22. The three-phase coils 23u, 23v, 23w are connected to form a Y-connection, for example. The manner in which the three-phase coils 23u, 23v, 23w are connected together is not limited to a Y-connection. The manner in which the three-phase coils 23u, 23v, 23w may be, for example, a delta connection.

The rotor 20 is cylindrical. The rotor 20 is fixed to the rotary shaft 17. The rotary shaft 17 is thus configured to rotate integrally with the rotor 20. The stator 21 is fixed to the peripheral wall 15b of the suction housing member 15. The rotor 20 and the stator 21 are opposed to each other in the radial direction of the rotary shaft 17.

The rotor 20 rotates when the three-phase coils 23u, 23v, 23w are energized in a specified pattern. The rotary shaft 17 rotates as the rotor 20 rotates. This drives the compression unit 18. The electric motor 19 thus drives the compression unit 18. The refrigerant that flows through the external refrigerant circuit 12 is drawn into the housing 14 through the suction port 14a. The compression unit 18 compresses the refrigerant that has been drawn into the housing 14. The compressed refrigerant is discharged to the external refrigerant circuit 12 through the discharge port 14b.

<Cover Member 25>

The housing 14 includes a cover member 25. The cover member 25 is made of a thermally conductive metal, such as aluminum. The cover member 25 includes a plate-shaped end wall 25a and a tubular peripheral wall 25b. The cover member 25 is attached to the end wall 15a of the suction housing member 15 such that the opening end of the peripheral wall 25b abuts the end wall 15a. The cover member 25 is fixed to the suction housing member 15 with bolts 26. The opening of the peripheral wall 25b of the cover member 25 is closed by the end wall 15a. The end wall 15a and the cover member 25 define an inverter accommodating chamber S1. The housing 14 thus includes the inverter accommodating chamber S1.

<Connector 27 and Power Storage Device 28>

The motor-driven compressor 11 includes a connector 27. The connector 27 is electrically connected to a power storage device 28 mounted on the vehicle. The connector 27 is provided in the cover member 25. The power storage device 28 is a power supply that supplies electric power to devices mounted on the vehicle. The power storage device 28 is a DC power supply. The power storage device 28 is, for example, a rechargeable battery or a capacitor.

<Inverter Device 30>

The motor-driven compressor 11 includes an inverter device 30. The inverter device 30 is accommodated in the inverter accommodating chamber S1. The housing 14 thus accommodates the inverter device 30. The inverter device 30 is electrically connected to the power storage device 28 via the connector 27.

The inverter device 30 incudes a circuit board 30a. The circuit board 30a is accommodated in the inverter accommodating chamber S1. The circuit board 30a is opposed to the end wall 15a at a specified distance in the axial direction of the rotary shaft 17. The circuit board 30a is accommodated in the inverter accommodating chamber S1 with the thickness direction of the circuit board 30a agreeing with the axial direction of the rotary shaft 17.

The inverter device 30 drives the electric motor 19. The inverter device 30 includes an inverter circuit 31 and a noise reducing unit 32. The inverter circuit 31 converts DC power into AC power. The noise reducing unit 32 is arranged on the input side of the inverter circuit 31. The noise reducing unit 32 reduces common-mode noise and normal-mode noise included in the DC power before being input to the inverter circuit 31.

<Inverter Circuit 31>

Figure 2:
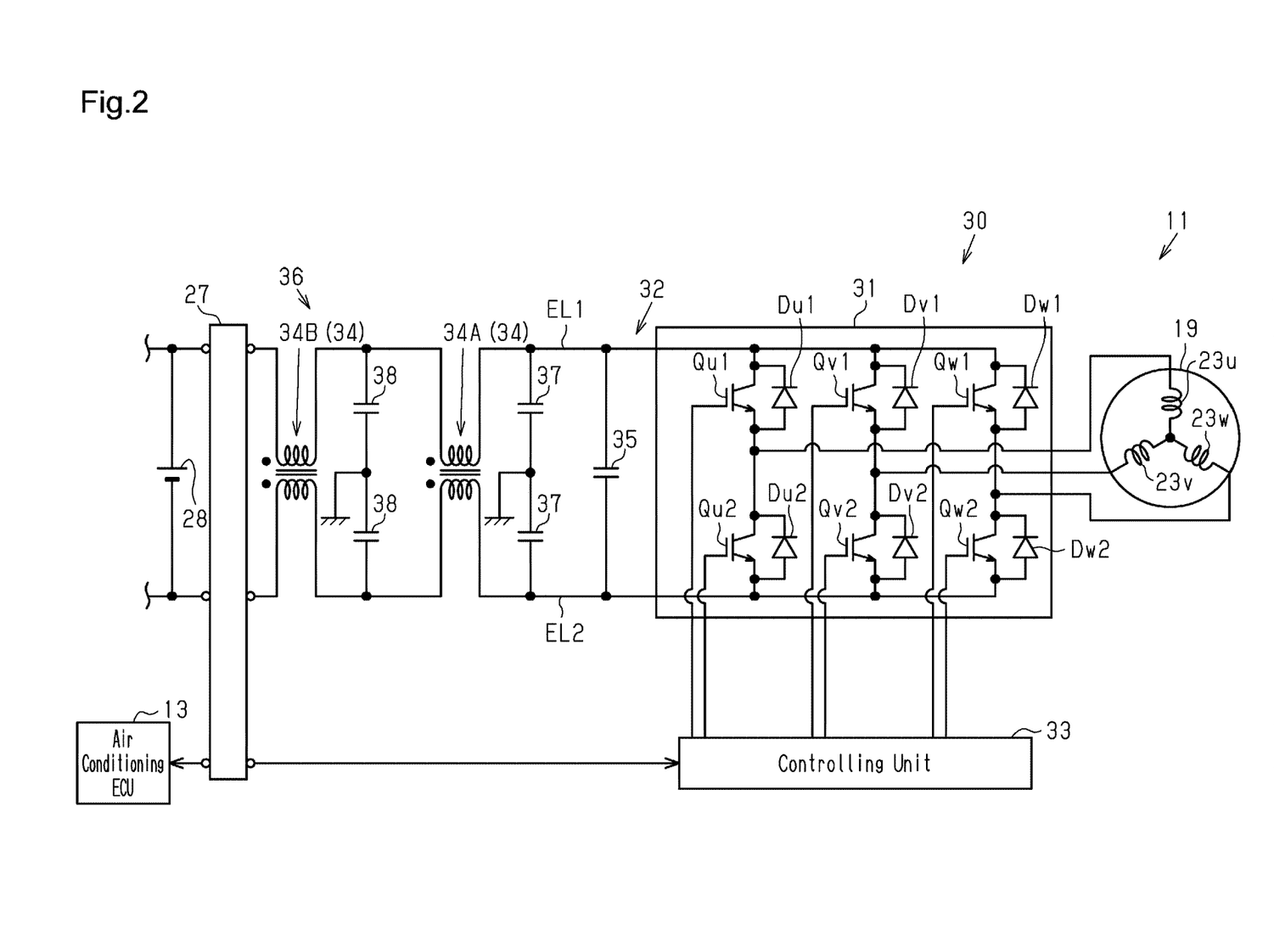
FIG. 2 is a circuit diagram showing the electrical configuration of the motor-driven compressor shown in FIG. 1.

As shown in FIG. 2, the inverter circuit 31 includes two connection lines EL1, EL2. The inverter circuit 31 includes u-phase switching elements Qu1, Qu2, which correspond to the u-phase coil 23u. The inverter circuit 31 includes v-phase switching elements Qv1, Qv2, which correspond to the v-phase coil 23v. The inverter circuit 31 includes w-phase switching elements Qw1, Qw2, which correspond to the w-phase coil 23w. Each of the switching elements Qu1 to Qw2 is, for example, a power switching element such as an IGBT. The switching elements Qu1 to Qw2 include freewheeling diodes (body diodes) Du1 to Dw2.

The u-phase switching elements Qu1, Qu2 are connected in series. The section between the u-phase switching elements Qu1, Qu2 is connected to the u-phase coil 23u. A serially-connected body of the u-phase switching elements Qu1, Qu2 is electrically connected to the connection lines EL1, EL2.

The v-phase switching elements Qv1, Qv2 are connected in series. The section between the v-phase switching elements Qv1, Qv2 is connected to the v-phase coil 23v. A serially-connected body of the v-phase switching elements Qv1, Qv2 is electrically connected to the connection lines EL1, EL2.

The w-phase switching elements Qw1, Qw2 are connected in series. The section between the w-phase switching elements Qw1, Qw2 is connected to the w-phase coil 23w. A serially-connected body of the w-phase switching elements Qw1, Qw2 is electrically connected to the connection lines EL1, EL2.

The inverter device 30 includes a controlling unit 33. The controlling unit 33 controls switching operations of the switching elements Qu1 to Qw2. The controlling unit 33 may include, for example, at least one dedicated hardware circuit and/or at least one processor (control circuits) that operates in accordance with a computer program (software). The processor includes a CPU and a memory such as a RAM and a ROM. The memory stores program codes or commands configured to cause the processor to execute various processes. The memory, or a computer-readable medium, includes any type of medium that is accessible by a general-purpose computer or a dedicated computer.

The controlling unit 33 is electrically connected to the air conditioning ECU 13 via the connector 27. Based on commands from the air conditioning ECU 13, the controlling unit 33 periodically turns on and off the switching elements Qu1 to Qw2. Specifically, based on commands from the air conditioning ECU 13, the controlling unit 33 performs pulse width modulation control (PWM control) on the switching elements Qu1 to Qw2. More specifically, the controlling unit 33 uses a carrier signal (carrier wave signal) and a commanded voltage value signal (signal for comparison) to generate control signals. The controlling unit 33 performs ON-OFF control of the switching elements Qu1 to Qw2 by using the generated control signals, thereby converting DC power to AC power.

<Noise Reducing Unit 32>

The noise reducing unit 32 includes one or more (two in the present embodiment) common-mode choke coils 34 and a smoothing capacitor 35. The smoothing capacitor 35 is included in a low-pass filter circuit 36 together with the common-mode choke coils 34. The low-pass filter circuit 36 is provided on the connection lines EL1, EL2. The low-pass filter circuit 36 is provided between the connector 27 and the inverter circuit 31 in the circuit structure. The common-mode choke coils 34 are provided on the connection lines EL1, EL2.

The smoothing capacitor 35 is located between the common-mode choke coils 34 and the inverter circuit 31. The smoothing capacitor 35 is an X capacitor, which is connected in parallel with the inverter circuit 31. The smoothing capacitor 35 is electrically connected to the connection lines EL1, EL2. The common-mode choke coils 34 and the smoothing capacitor 35 form an LC resonance circuit. The low-pass filter circuit 36 of the present embodiment is an LC resonance circuit including the common-mode choke coil 34.

The common-mode choke coils 34 include a first coil 34A and a second coil 34B. The noise reducing unit 32 includes the first coil 34A and the second coil 34B. The first coil 34A and the second coil 34B are connected in series. The first coil 34A is located between the second coil 34B and the inverter circuit 31.

The noise reducing unit 32 includes two first capacitors 37. The two first capacitors 37 are connected in series. The section between the two first capacitors 37 is grounded to the body of the vehicle via the housing 14. The two first capacitors 37 are located between the first coil 34A and the inverter circuit 31. The two first capacitors 37 are connected in parallel with the first coil 34A. The two first capacitors 37 are connected in parallel with the smoothing capacitor 35. The two first capacitors 37 are located between the first coil 34A and the smoothing capacitor 35.

The noise reducing unit 32 includes two second capacitors 38. The two second capacitors 38 are connected in series. The section between the two second capacitors 38 is grounded to the body of the vehicle via the housing 14. The two second capacitors 38 are located between the second coil 34B and the inverter circuit 31. The two second capacitors 38 are connected in parallel with the second coil 34B. The two second capacitors 38 are connected in parallel with the first coil 34A. The two second capacitors 38 are located between the first coil 34A and the second coil 34B.

The first coil 34A and the second coil 34B limit transmission of high frequency noise generated in the vehicle to the inverter circuit 31 of the motor-driven compressor 11. The first coil 34A and the second coil 34B use the leakage inductance as a normal inductance. Accordingly, the first coil 34A and the second coil 34B are used as L components in the low-pass filter circuit (LC filter) 36, which eliminates normal-mode noise (differential-mode noise). The first coil 34A and the second coil 34B thus can cope with common-mode noise and normal-mode noise (differential-mode noise). In other words, the motor-driven compressor 11 of the present embodiment uses the common-mode choke coils 34 to cope with common-mode noise and normal-mode noise (differential-mode noise), instead of using a choke coil for common mode and another choke coil for normal mode (differential mode).

<First Coil 34A>

Figure 3:
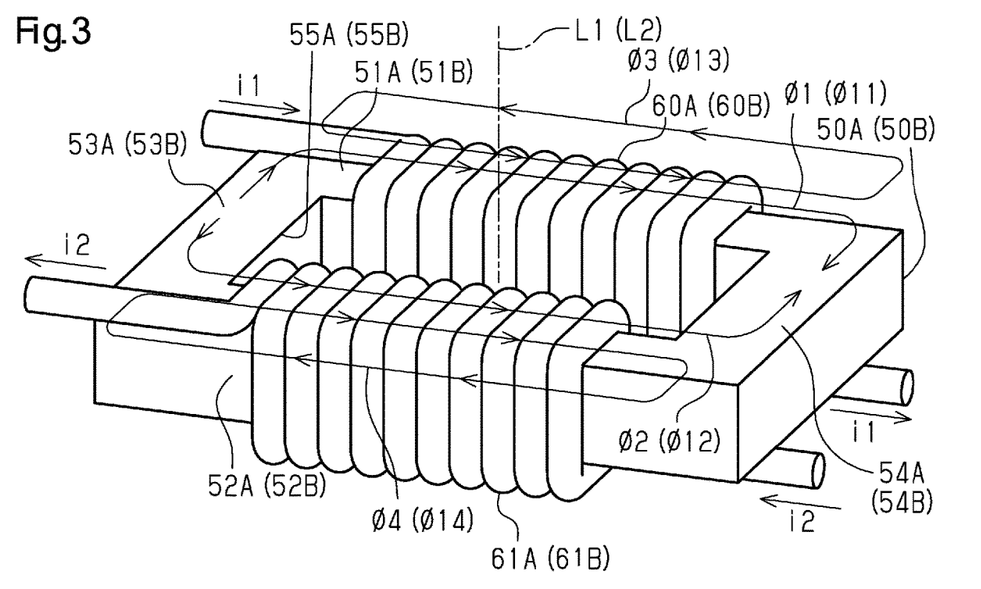
FIG. 3 is a perspective view showing a first core, a first winding, and a second winding.
Figure 4:
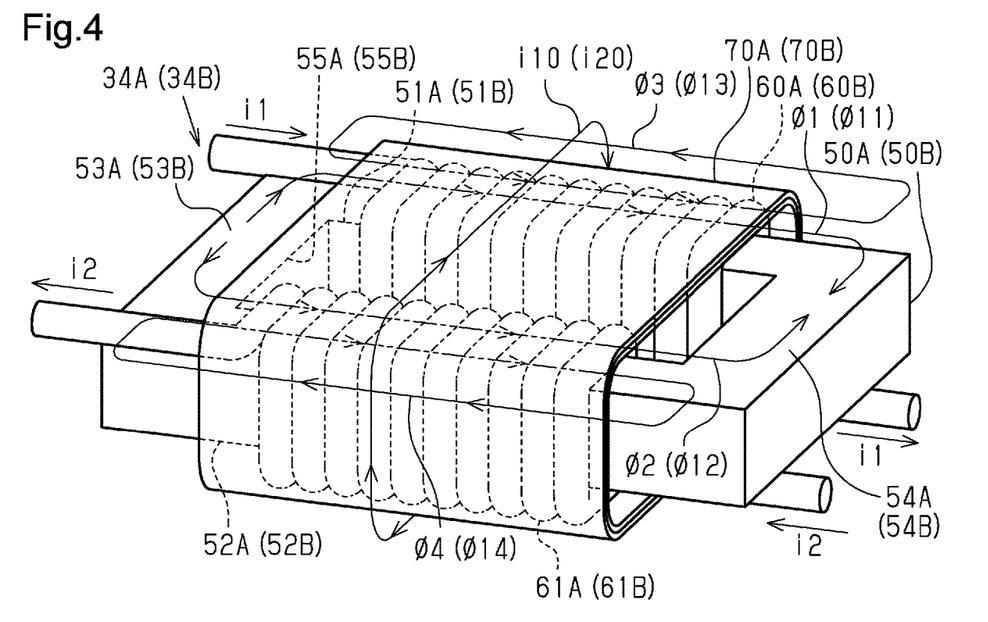
FIG. 4 is a perspective view of a first coil.

As shown in FIGS. 3 and 4, the first coil 34A includes a first core 50A, a first winding 60A, a second winding 61A, and a first conductor 70A. The first core 50A is annular. The first core 50A is made of a ferromagnetic material. The first core 50A includes, for example, a ferrite core. The first core 50A includes a first straight portion 51A, a second straight portion 52A, a first coupling portion 53A, and a second coupling portion 54A.

As shown in FIG. 3, the first straight portion 51A extends linearly. The first straight portion 51A and the second straight portion 52A each have a shape of, for example, a quadrangular prism. At least part of the first winding 60A is wound around the first straight portion 51A. The second straight portion 52A has a shape of, for example, a quadrangular prism. The second straight portion 52A and the first straight portion 51A extend parallel with each other. Therefore, the first straight portion 51A and the second straight portion 52A are arranged such that the direction in which the axis of the first straight portion 51A extends and the direction in which the axis of the second straight portion 52A extends agree with each other. The second straight portion 52A is located at a position separated from the first straight portion 51A and faces the first straight portion 51A. At least part of the second winding 61A is wound around the second straight portion 52A. The first winding 60A and the second winding 61A are thus wound around the first core 50A. The second winding 61A is wound around the first core 50A at a position away from the first winding 60A so as to face the first winding 60A.

A plastic member (not shown) is provided between the first core 50A and the first winding 60A and between the first core 50A and the second winding 61A. The plastic member ensures insulation between the first core 50A and the first winding 60A and insulation between the first core 50A and the second winding 61A.

The first coupling portion 53A has a shape of, for example, a quadrangular prism. The first coupling portion 53A connects a first end of the first straight portion 51A and a first end of the second straight portion 52A. The second coupling portion 54A has a shape of, for example, a quadrangular prism. The second coupling portion 54A connects a second end of the first straight portion 51A and a second end of the second straight portion 52A.

As described above, the first core 50A includes the first straight portion 51A, the second straight portion 52A, the first coupling portion 53A, and the second coupling portion 54A which are arranged to be annular as a whole, so that a first hole 55A is defined inside.

As shown in FIG. 4, the first conductor 70A is a metal film. The first conductor 70A may be made of any metal, but is preferably made of a copper foil, which is a nonmagnetic material. The first conductor 70A is annular. Specifically, the first conductor 70A is band-shaped and endless. The first conductor 70A has, for example, the shape of a rectangular tube. The first conductor 70A has a uniform thickness. The thickness of the first conductor 70A is not particularly limited, but is preferably in a range of 10 µm to 100 µm. In the present embodiment, the thickness of the first conductor 70A is 35 µm. The first conductor 70A has a strength sufficient to maintain the shape of the first conductor 70A.

The first conductor 70A extends over and surrounds the first winding 60A and the second winding 61A. Specifically, the first conductor 70A covers the entire first winding 60A, the entire second winding 61A, and part of the first hole 55A inside the first core 50A. The first conductor 70A includes two regions respectively covering two openings of the first hole 55A inside the first core 50A, and the two regions are opposed to each other with the first hole 55A between them. The first coupling portion 53A and the second coupling portion 54A are exposed without being covered with the first conductor 70A. An insulating layer is interposed between the first conductor 70A and each of the first winding 60A and the second winding 61A. The first conductor 70A is thermally coupled to the end wall 15a of the suction housing member 15.

Currents i1, i2 flow in response to energization of the first winding 60A and the second winding 61A. This generates magnetic fluxes $\varphi1$, $\varphi2$ in the first core 50A and also generates leakage magnetic fluxes $\varphi3$, $\varphi4$. The magnetic fluxes $\varphi1$, $\varphi2$ are opposite to each other. An induced current i10 flows in the circumferential direction inside the first conductor 70A so as to generate magnetic fluxes in a direction of resisting the leakage flux $\varphi3$, $\varphi4$. In this manner, the induced current i10 flows in the circumferential direction inside the first conductor 70A so as to generate a magnetic flux in a direction of resisting the leakage magnetic fluxes $\varphi3$, $\varphi4$ generated by the energization of the first winding 60A and the second winding 61A. The induced current i10 circulates around the first core 50A. The first conductor 70A is formed to be thin and thus has an increased resistance. The first conductor 70A thus can effectively convert the induced current i10 into heat.

<Second Coil 34B>

As shown in FIGS. 3 and 4, the second coil 34B includes a second core 50B, a third winding 60B, a fourth winding 61B, and a second conductor 70B. The second core 50B is annular. The second core 50B is made of a ferromagnetic material. The second core 50B includes, for example, a ferrite core. The second core 50B includes a third straight portion 51B, a fourth straight portion 52B, a third coupling portion 53B, and a fourth coupling portion 54B. The first core 50A and the second core 50B have the same shape.

As shown in FIG. 3, the third straight portion 51B extends linearly. The third straight portion 51B and the fourth straight portion 52B each have a shape of, for example, a quadrangular prism. At least part of the third winding 60B is wound around the third straight portion 51B. The fourth straight portion 52B has a shape of, for example, a quadrangular prism. The fourth straight portion 52B and the third straight portion 51B extend parallel with each other. Therefore, the third straight portion 51B and the fourth straight portion 52B are arranged such that the direction in which the axis of the third straight portion 51B extends agrees with the direction in which the axis of the fourth straight portion 52B extends. The fourth straight portion 52B is separated from the third straight portion 51B and faces the third straight portion 51B. At least part of the fourth winding 61B is wound around the fourth straight portion 52B. The third winding 60B and the fourth winding 61B are thus wound around the second core 50B. The fourth winding 61B is wound around the second core 50B at a position away from the third winding 60B so as to face the third winding 60B.

A plastic member (not shown) is provided between the second core 50B and the third winding 60B and between the second core 50B and the fourth winding 61B. The plastic member ensures insulation between the second core 50B and the third winding 60B and insulation between the second core 50B and the fourth winding 61B.

The third coupling portion 53B has a shape of, for example, a quadrangular prism. The third coupling portion 53B connects a first end of the third straight portion 51B and a first end of the fourth straight portion 52B. The fourth coupling portion 54B has a shape of, for example, a quadrangular prism. The fourth coupling portion 54B connects a second end of the third straight portion 51B and a second end of the fourth straight portion 52B.

As described above, the second core 50B includes the third straight portion 51B, the fourth straight portion 52B, the third coupling portion 53B, and the fourth coupling portion 54B which are arranged to be annular, so that a second hole 55B is defined inside.

As shown in FIG. 4, the second conductor 70B is a metal film. The second conductor 70B may be made of any metal, but is preferably made of a copper foil, which is a nonmagnetic material. The second conductor 70B is annular. Specifically, the second conductor 70B is band-shaped and endless. The second conductor 70B has, for example, the shape of a rectangular tube. The second conductor 70B has a uniform thickness. The thickness of the second conductor 70B is not particularly limited, but is preferably in a range of 10 μm to 100 μm. In the present embodiment, the thickness of the second conductor 70B is 35 μm. The second conductor 70B has a strength sufficient to maintain the shape of the second conductor 70B.

The second conductor 70B extends over and surrounds the third winding 60B and the fourth winding 61B. Specifically, the second conductor 70B covers the entire third winding 60B, the entire fourth winding 61B, and part of the second hole 55B inside the second core 50B. The second conductor 70B includes two regions respectively covering two openings of the second hole 55B inside the second core 50B, and the two regions are opposed to each other with the second hole 55B between them. The third coupling portion 53B and the fourth coupling portion 54B are exposed without being covered with the second conductor 70B. An insulating layer is interposed between the second conductor 70B and each of the third winding 60B and the fourth winding 61B. The second conductor 70B is thermally coupled to the end wall 15a of the suction housing member 15.

Currents i1, i2 flow in response to energization of the third winding 60B and the fourth winding 61B. This generates magnetic fluxes φ11, φ12 in the second core 50B and also generates leakage magnetic fluxes φ13, φ14. The magnetic fluxes φ11, φ12 are opposite to each other. An induced current i20 flows in the circumferential direction inside the second conductor 70B so as to generate magnetic fluxes in a direction of resisting the leakage flux φ13, φ14. In this manner, the induced current i20 flows in the circumferential direction inside the second conductor 70B so as to generate a magnetic flux in a direction of resisting the leakage magnetic fluxes φ13, φ14 generated by the energization of the third winding 60B and the fourth winding 61B. The induced current i20 circulates around the second core 50B. The second conductor 70B is formed to be thin and thus has an increased resistance. The second conductor 70B thus can effectively convert the induced current i20 into heat.

<Positional Relationship Between First Coil 34A and Second Coil 34B>

Figure 5:
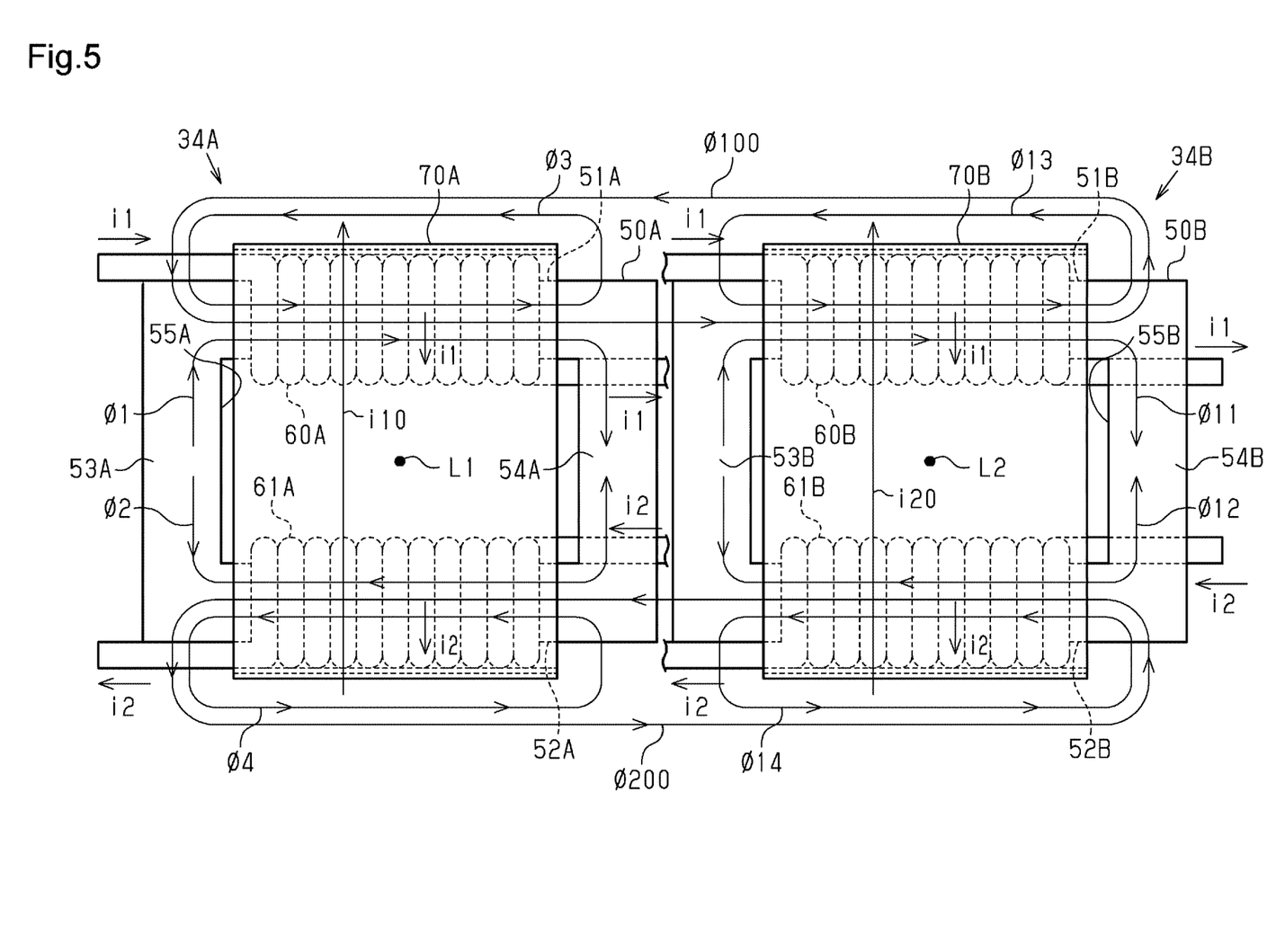
FIG. 5 is a plan view showing a first coil and a second coil of FIG. 1.

As shown in FIG. 5, the first coil 34A and the second coil 34B are arranged side by side such that the first straight portion 51A and the third straight portion 51B are arranged on the same straight line and the second straight portion 52A and the fourth straight portion 52B are arranged on the same straight line. The second coupling portion 54A and the third coupling portion 53B are adjacent to each other in the arrangement direction of the first coil 34A and the second coil 34B. The first coil 34A and the second coil 34B are arranged side by side such that a central axis L1 of the first core 50A and a central axis L2 of the second core 50B extend parallel to each other.

The first winding 60A and the third winding 60B are connected in series. The first winding 60A and the third winding 60B are thus electrically connected to each other. The second winding 61A and the fourth winding 61B are connected in series. The second winding 61A and the fourth winding 61B are thus electrically connected to each other. The current flowing through the first winding 60A at the first straight portion 51A, the current flowing through the second winding 61A at the second straight portion 52A, the current flowing through the third winding 60B at the third straight portion 51B, and the current flowing through the fourth winding 61B at the fourth straight portion 52B flow in the same circulating direction.

<Operation of Embodiment>

Operation of the present embodiment will now be described.

Figure 6:
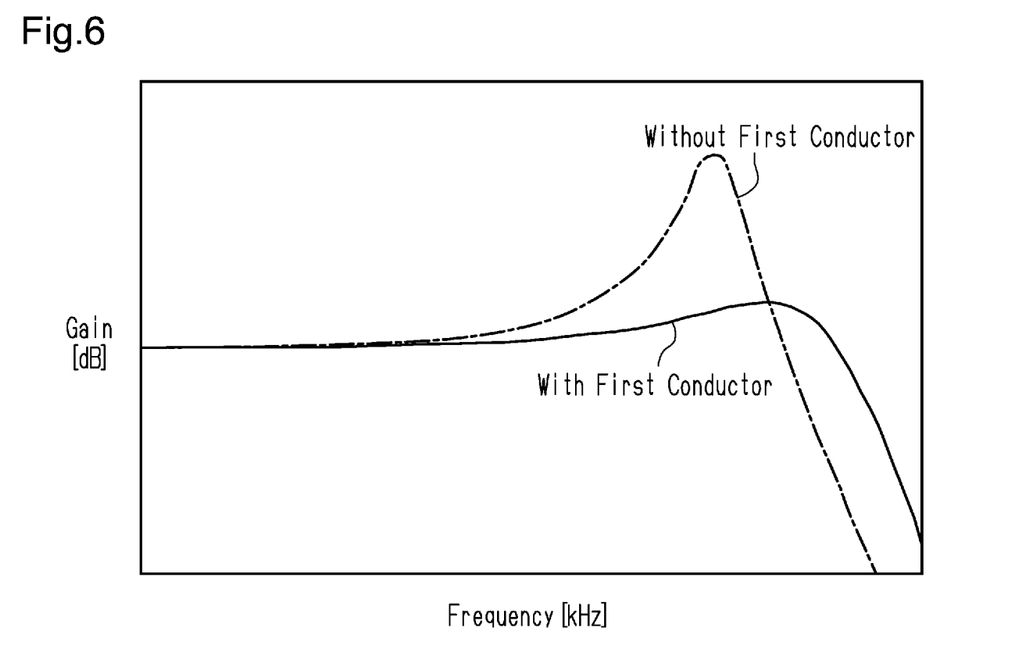
FIG. 6 is a graph showing the frequency characteristic of the gain of a low-pass filter circuit.

FIG. 6 is a graph showing the frequency characteristic of the gain (attenuation amount) of the low-pass filter circuit 36 in relation to inflow normal-mode noise. The solid line in FIG. 6 represents, for example, a case in which the first conductor 70A is present on the first coil 34A. The long-dash short-dash line in FIG. 6 represents, for example, a case in which the first conductor 70A is not present on the first coil 34A. In FIG. 6, the frequency is plotted logarithmically on the horizontal axis. The gain is a type of parameter indicating an amount by which the normal mode noise can be reduced.

As indicated by the long-dash short-dash line in FIG. 6, when the first conductor 70A is not present on the first coil 34A, the Q factor of the low-pass filter circuit 36 is relatively high. Therefore, normal mode noise having the frequency close to the resonance frequency of the low-pass filter circuit 36 cannot be easily reduced.

When the first conductor 70A is present on the first coil 34A, the first conductor 70A is provided at a position passing through the loops of the leakage fluxes φ3, φ4. The first conductor 70A is configured to generate an induced current (eddy current) that generates magnetic fluxes in a direction canceling the leakage magnetic fluxes φ3, φ4 by the leakage magnetic fluxes φ3, φ4. As a result, the first conductor 70A lowers the Q factor of the low-pass filter circuit 36. Thus, as indicated by the solid line in FIG. 6, the Q factor of the low-pass filter circuit 36 is relatively low. Therefore, the normal mode noise having the frequency near the resonance frequency of the low-pass filter circuit 36 is also reduced by the low-pass filter circuit 36.

As described above, common-mode noise is reduced by using the metallic shield structure of the first conductor 70A, which is band-shaped and endless, on the first coil 34A. Also, the leakage magnetic fluxes generated in response to the normal mode current (differential mode current) are exploited to acquire an appropriate filtering performance with reduction in the normal mode noise (differential mode noise). Specifically, by using the band-shaped and endless first conductor 70A, magnetic fluxes resisting the leakage magnetic fluxes generated during the energization with the normal mode current (differential mode current), and current flows in the first conductor 70A by electromagnetic induction to be consumed as heat. Since the first conductor 70A functions as a magnetic resistance, a damping effect is produced, and the resonance peak generated by the low-pass filter circuit 36 is suppressed. The second coil 34B operates in the same manner as the first coil 34A.

As shown in FIG. 5, the first coil 34A and the second coil 34B are arranged side by side such that the first straight portion 51A and the third straight portion 51B are arranged on the same straight line and the second straight portion 52A and the fourth straight portion 52B are arranged on the same straight line. When the current i1 flows through the first winding 60A and the third winding 60B in response to energization of the first winding 60A and the third winding 60B, the leakage magnetic fluxes φ3 and φ13 generated respectively from the first coil 34A and the second coil 34B, intensify each other. This generates a magnetic flux φ100 passing through the first straight portion 51A and the third straight portion 51B. The direction of the magnetic flux φ100 is the same as the direction of the leakage magnetic fluxes φ3 and φ13. The magnetic flux 100 is generated by the current i1 flowing through the first winding 60A and passes through the third straight portion 51B. Also, the magnetic flux φ100 is generated by the current i1 flowing through the third winding 60B and passes through the first straight portion 51A.

Therefore, the first coil 34A and the second coil 34B are arranged side by side such that the direction of the magnetic flux φ100, which is generated by the current i1 flowing through the first winding 60A and passes through the third straight portion 51B, is the same as the direction of the magnetic flux φ13, which is generated by the current i1 flowing through the third winding 60B and passes through the third straight portion 51B, and such that the direction of the magnetic flux φ100, which is generated by the current i1 flowing through the third winding 60B and passes through the first straight portion 51A, is the same as the direction of the magnetic flux φ3, which is generated by the current i1 flowing through the first winding 60A and passes through the first straight portion 51A. The first coil 34A and the second coil 34B are arranged side by side such that the current i1 flowing through the first winding 60A and the third winding 60B generates the annular magnetic flux φ100, which passes through both of the first straight portion 51A and the third straight portion 51B.

When the current i2 flows through the second winding 61A and the fourth winding 61B in response to energization of the second winding 61A and the fourth winding 61B, the leakage magnetic fluxes φ4 and φ14 generated respectively from the first coil 34A and the second coil 34B, intensify each other. This generates a magnetic flux φ200 passing through the second straight portion 52A and the fourth straight portion 52B. The direction of the magnetic flux φ200 is the same as the direction of the leakage magnetic fluxes φ4 and φ14. The magnetic flux φ200 is generated by the current i2 flowing through the second winding 61A and passes through the fourth straight portion 52B. Also, the magnetic flux φ100 is generated by the current i2 flowing through the fourth winding 61B and passes through the third straight portion 51B.

Therefore, the first coil 34A and the second coil 34B are arranged side by side such that the direction of the magnetic flux φ200, which is generated by the current i2 flowing through the second winding 61A and passes through the fourth straight portion 52B, is the same as the direction of the magnetic flux φ14, which is generated by the current i2 flowing through the fourth winding 61B and passes through the fourth straight portion 52B, and such that the direction of the magnetic flux 200, which is generated by the current i2 flowing through the fourth winding 61B and passes through the second straight portion 52A, is the same as the direction of the magnetic flux φ4, which is generated by the current i2 flowing through the second winding 61A and passes through the second straight portion 52A. The first coil 34A and the second coil 34B are arranged side by side such that the current i2 flowing through the second winding 61A and the fourth winding 61B generates the annular magnetic flux 200, which passes through both of the second straight portion 52A and the fourth straight portion 52B.

As described above, the current i1 flowing through the first winding 60A and the third winding 60B generates the annular magnetic flux φ100, which passes through both of the first straight portion 51A and the third straight portion 51B. The leakage magnetic fluxes φ3 and φ13, which are generated respectively from the first coil 34A and the second coil 34B, thus intensify each other. This generates mutual inductance. Also, the current i2 flowing through the second winding 61A and the fourth winding 61B generates the annular magnetic flux φ200, which passes through both of the second straight portion 52A and the fourth straight portion 52B. The leakage magnetic fluxes φ4 and φ14, which are generated respectively from the first coil 34A and the second coil 34B, thus intensify each other. This generates mutual inductance. The damping effect produced in each of the first conductor 70A and the second conductor 70B increases in proportion to the mutual inductance. Therefore, for example, as compared with a case in which the first coil 34A and the second coil 34B are disposed unthoughtfully, an excellent damping effect is produced, and the resonance peak generated by the low-pass filter circuit 36 is readily suppressed.

<Advantages of Embodiment>

The above-described embodiment has the following advantages.

(1) The current i1 flowing through the first winding 60A and the third winding 60B generates the annular magnetic flux φ100, which passes through both of the first straight portion 51A and the third straight portion 51B. Leakage magnetic fluxes that are generated respectively from the first coil 34A and the second coil 34B thus intensify each other. This generates mutual inductance. The damping effect produced in each of the first conductor 70A and the second conductor 70B increases in proportion to the mutual inductance. Therefore, for example, as compared with a case in which the first coil 34A and the second coil 34B are disposed unthoughtfully, an excellent damping effect is produced.

(2) The first coil 34A and the second coil 34B are arranged side by side such that the first straight portion 51A and the third straight portion 51B are arranged on the same straight line and the second straight portion 52A and the fourth straight portion 52B are arranged on the same straight line, and such that the current i2 flowing through the second winding 61A and the fourth winding 61B generates the annular magnetic flux φ200, which passes through both of the second straight portion 52A and the fourth straight portion 52B With this configuration, the current i2 flowing through the second winding 61A and the fourth winding 61B generates the annular magnetic flux φ200, which passes through both of the second straight portion 52A and the fourth straight portion 52B. Leakage magnetic fluxes that are generated respectively from the first coil 34A and the second coil 34B thus intensify each other. This generates mutual inductance. The damping effect produced in each of the first conductor 70A and the second conductor 70B increases in proportion to the mutual inductance. Therefore, an excellent damping effect is produced.

(3) The first core 50A and the second core 50B have the same shape. This configuration improves the productivity of the motor-driven compressor 11.

<Modifications>

The above-described embodiment may be modified as follows. The above-described embodiment and the following modifications can be combined as long as the combined modifications remain technically consistent with each other.

Figure 7:
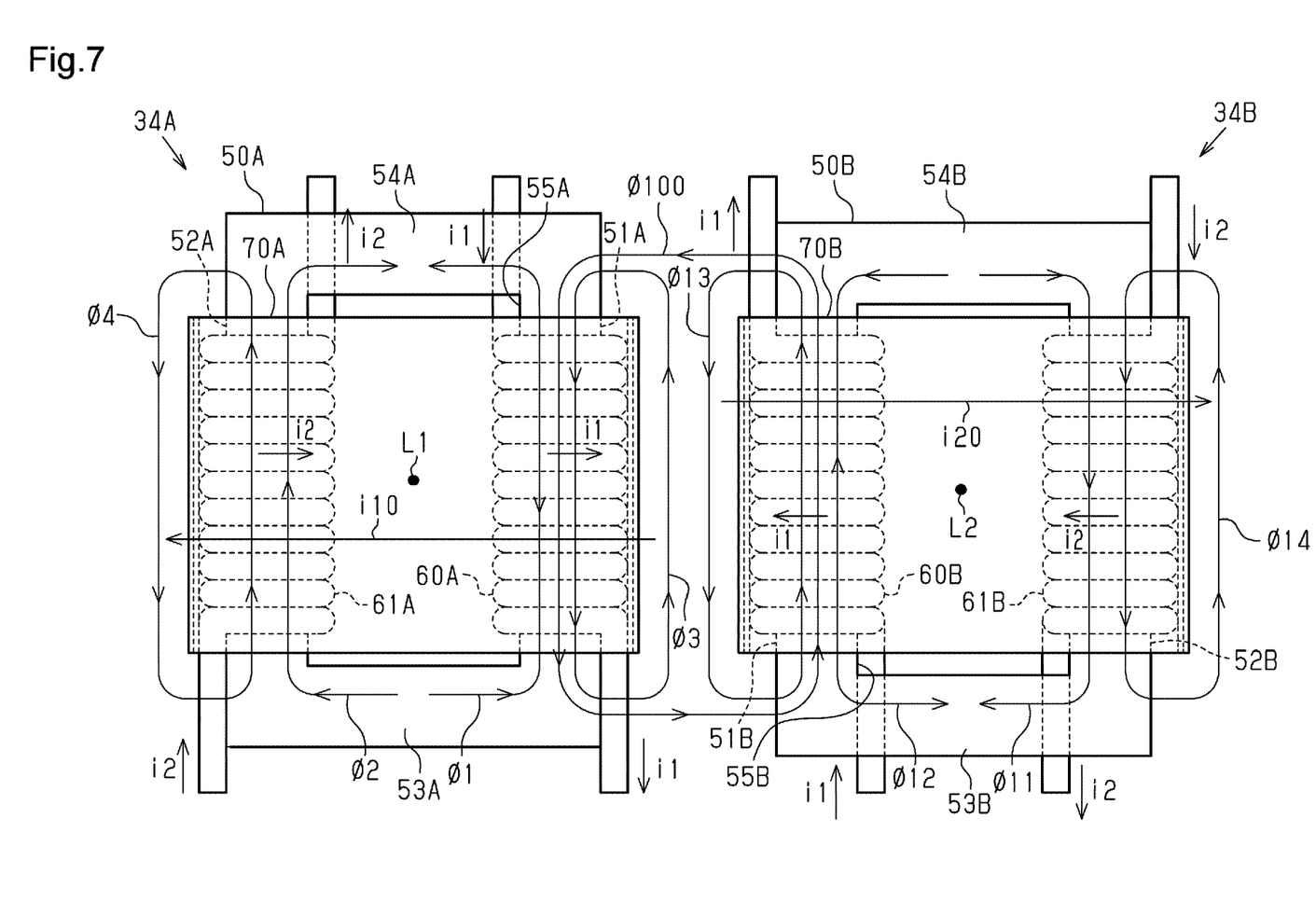
FIG. 7 is a plan view showing a first coil and a second coil according to a first modification.

As in a first modification shown in FIG. 7, the first coil 34A and the second coil 34B may be arranged side by side such that the first straight portion 51A, the second straight portion 52A, the third straight portion 51B, and the fourth straight portion 52B are arranged in parallel.

The first straight portion 51A and the third straight portion 51B are adjacent to each other in the arrangement direction of the first coil 34A and the second coil 34B. The first coil 34A and the second coil 34B are arranged side by side such that a central axis L1 of the first core 50A and a central axis L2 of the second core 50B extend parallel to each other.

The first winding 60A and the third winding 60B are connected in series. The second winding 61A and the fourth winding 61B are connected in series. The current i1 flowing through the first winding 60A at the first straight portion 51A and the current i1 flowing through the third winding 60B at the third straight portion 51B flow in opposite circulating directions. The current i2 flowing through the second winding 61A at the second straight portion 52A and the current i2 flowing through the fourth winding 61B at the fourth straight portion 52B flow in opposite circulating directions.

When the current i1 flows through the first winding 60A and the third winding 60B in response to energization of the first winding 60A and the third winding 60B, the leakage magnetic fluxes φ3 and φ13 generated respectively from the first coil 34A and the second coil 34B, intensify each other. This generates a magnetic flux φ100 passing through the first straight portion 51A and the third straight portion 51B. The direction of the magnetic flux 100 is the same as the direction of the leakage magnetic fluxes φ3 and φ13. The magnetic flux φ100 is generated by the current i1 flowing through the first winding 60A and passes through the third straight portion 51B. Also, the magnetic flux φ100 is generated by the current i1 flowing through the third winding 60B and passes through the first straight portion 51A.

Therefore, the first coil 34A and the second coil 34B are arranged side by side such that the direction of the magnetic flux φ100, which is generated by the current i1 flowing through the first winding 60A and passes through the third straight portion 51B, is the same as the direction of the magnetic flux 13, which is generated by the current i1 flowing through the third winding 60B and passes through the third straight portion 51B, and such that the direction of the magnetic flux φ100, which is generated by the current i1 flowing through the third winding 60B and passes through the first straight portion 51A, is the same as the direction of the magnetic flux φ3, which is generated by the current i1 flowing through the first winding 60A and passes through the first straight portion 51A. The first coil 34A and the second coil 34B are arranged side by side such that the current i1 flowing through the first winding 60A and the third winding 60B generates the annular magnetic flux φ100, which passes through both of the first straight portion 51A and the third straight portion 51B.

As described above, the current i1 flowing through the first winding 60A and the third winding 60B generates the annular magnetic flux φ100, which passes through both of the first straight portion 51A and the third straight portion 51B. The leakage magnetic fluxes φ3 and φ13, which are generated respectively from the first coil 34A and the second coil 34B, thus intensify each other. This generates mutual inductance. The damping effect produced in each of the first conductor 70A and the second conductor 70B increases in proportion to the mutual inductance. Therefore, for example, as compared with a case in which the first coil 34A and the second coil 34B are disposed unthoughtfully, an excellent damping effect is produced, and the resonance peak generated by the low-pass filter circuit 36 is readily suppressed.

The first coil 34A and the second coil 34B are arranged side by side such that the first straight portion 51A, the second straight portion 52A, the third straight portion 51B, and the fourth straight portion 52B are arranged in parallel. This configuration allows the first coil 34A and the second coil 34B to be disposed in the same plane, and thus improves the productivity of the motor-driven compressor 11.

Figure 8:
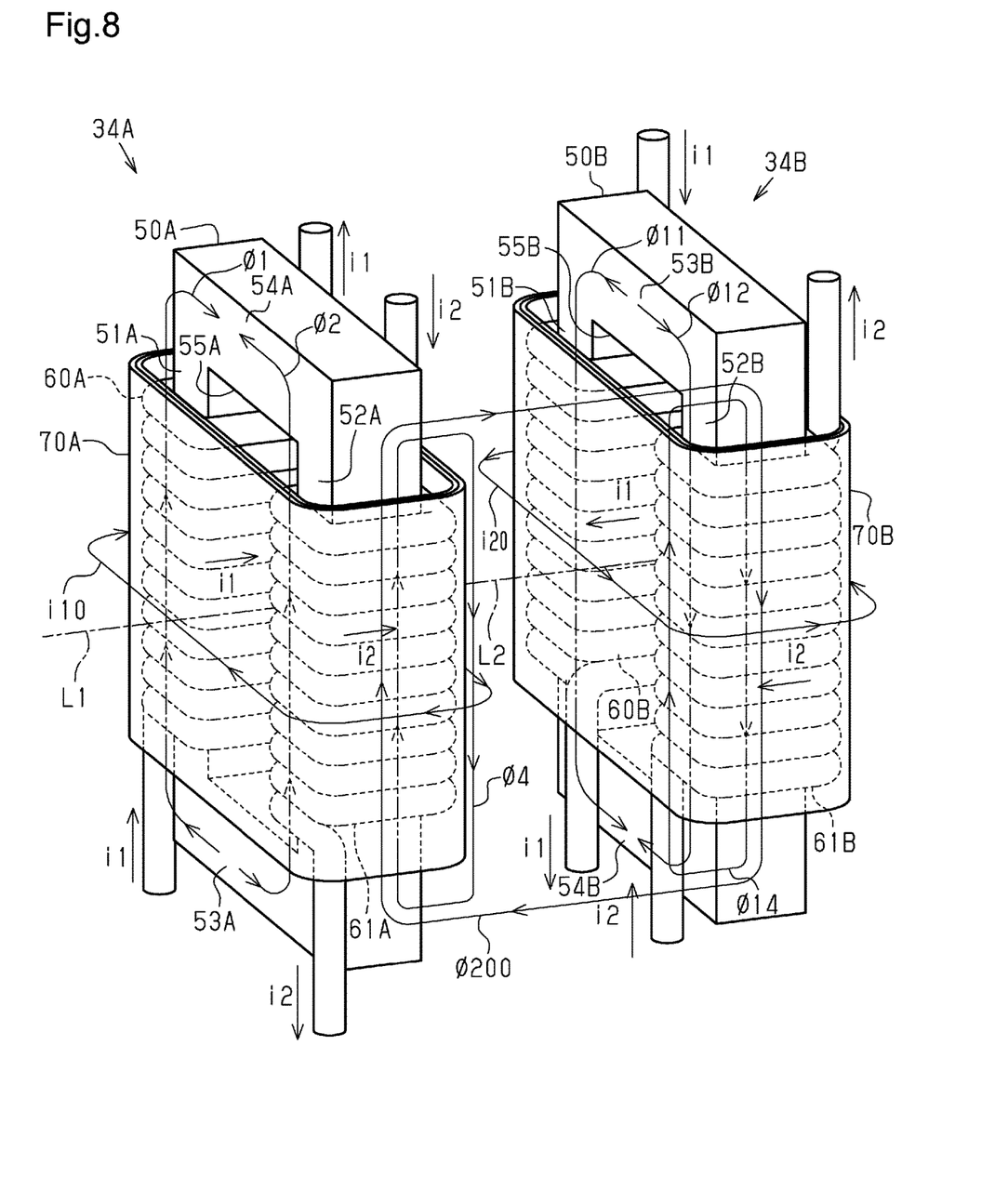
FIG. 8 is a perspective view showing a first coil and a second coil according to a second modification.
Figure 9:
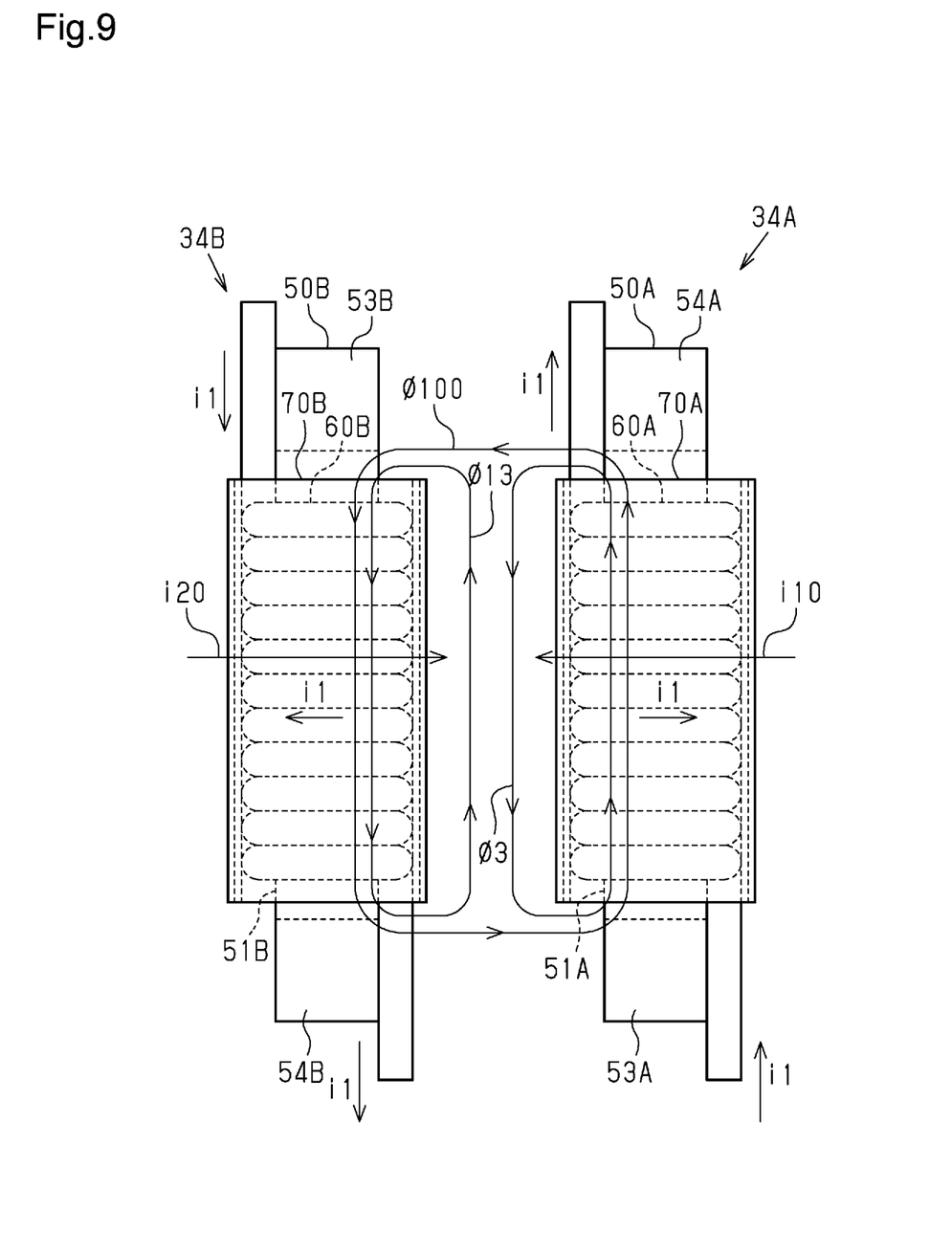
FIG. 9 is a side view showing the first coil and the second coil shown in FIG. 8.
Figure 10:
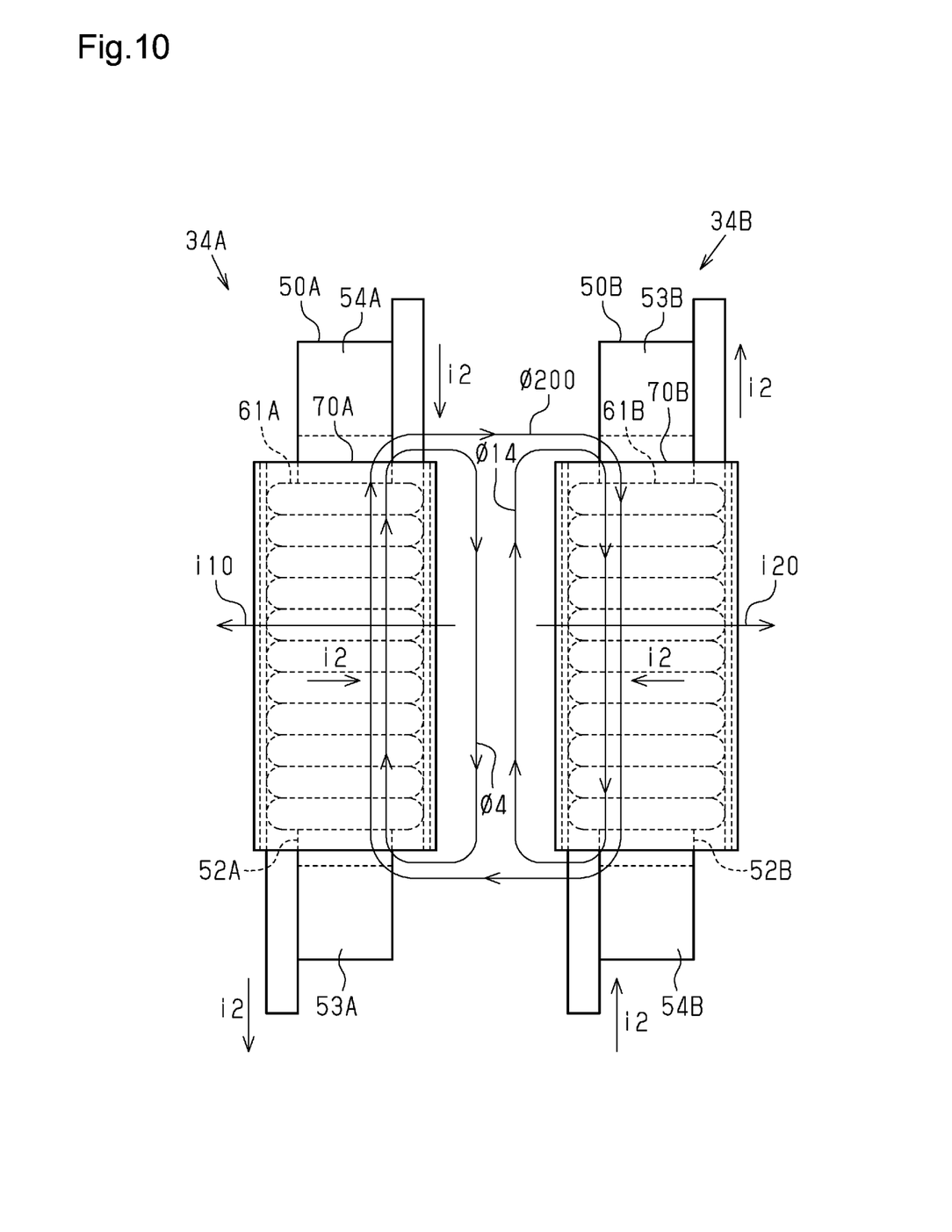
FIG. 10 is a side view showing the first coil and the second coil shown in FIG. 8.

As in a second modification shown in FIGS. 8, 9, and 10, the first coil 34A and the second coil 34B may be arranged such that the central axis L1 of the first core 50A and the central axis L2 of the second core 50B coincide with each other. The first coil 34A and the second coil 34B are arranged side by side such that the first straight portion 51A and the third straight portion 51B are arranged in parallel. The first coil 34A and the second coil 34B are arranged side by side such that the second straight portion 52A and the fourth straight portion 52B are arranged in parallel. The first straight portion 51A and the third straight portion 51B are adjacent to each other in the arrangement direction of the first coil 34A and the second coil 34B. The second straight portion 52A and the fourth straight portion 52B are adjacent to each other in the arrangement direction of the first coil 34A and the second coil 34B.

The first winding 60A and the third winding 60B are connected in series. The second winding 61A and the fourth winding 61B are connected in series. The current i1 flowing through the first winding 60A at the first straight portion 51A and the current i1 flowing through the third winding 60B at the third straight portion 51B flow in opposite circulating directions. The current i2 flowing through the second winding 61A at the second straight portion 52A and the current i2 flowing through the fourth winding 61B at the fourth straight portion 52B flow in opposite circulating directions.

When the current i1 flows through the first winding 60A and the third winding 60B in response to energization of the first winding 60A and the third winding 60B as shown in FIG. 9, the leakage magnetic fluxes φ3 and φ13 generated respectively from the first coil 34A and the second coil 34B, intensify each other. This generates a magnetic flux φ100 passing through the first straight portion 51A and the third straight portion 51B. The direction of the magnetic flux φ100 is the same as the direction of the leakage magnetic fluxes φ3 and φ13. The magnetic flux φ100 is generated by the current i1 flowing through the first winding 60A and passes through the third straight portion 51B. Also, the magnetic flux φ100 is generated by the current i1 flowing through the third winding 60B and passes through the first straight portion 51A.

Therefore, the first coil 34A and the second coil 34B are arranged side by side such that the direction of the magnetic flux φ100, which is generated by the current i1 flowing through the first winding 60A and passes through the third straight portion 51B, is the same as the direction of the magnetic flux φ13, which is generated by the current i1 flowing through the third winding 60B and passes through the third straight portion 51B, and such that the direction of the magnetic flux φ100, which is generated by the current i1 flowing through the third winding 60B and passes through the first straight portion 51A, is the same as the direction of the magnetic flux φ3, which is generated by the current i1 flowing through the first winding 60A and passes through the first straight portion 51A. The first coil 34A and the second coil 34B are arranged side by side such that the first core 50A and the second core 50B surround the same axis, and such that the current i1 flowing through the first winding 60A and the third winding 60B generates the annular magnetic flux φ100, which passes through both of the first straight portion 51A and the third straight portion 51B.

When the current i2 flows through the second winding 61A and the fourth winding 61B in response to energization of the second winding 61A and the fourth winding 61B as shown in FIG. 10, the leakage magnetic fluxes φ4 and φ14 generated respectively from the first coil 34A and the second coil 34B, intensify each other. This generates a magnetic flux φ200 passing through the second straight portion 52A and the fourth straight portion 52B. The direction of the magnetic flux φ200 is the same as the direction of the leakage magnetic fluxes φ4 and φ14. The magnetic flux 200 is generated by the current i2 flowing through the second winding 61A and passes through the fourth straight portion 52B. Also, the magnetic flux φ100 is generated by the current i2 flowing through the fourth winding 61B and passes through the third straight portion 51B.

Therefore, the first coil 34A and the second coil 34B are arranged side by side such that the direction of the magnetic flux φ200, which is generated by the current i2 flowing through the second winding 61A and passes through the fourth straight portion 52B, is the same as the direction of the magnetic flux φ14, which is generated by the current i2 flowing through the fourth winding 61B and passes through the fourth straight portion 52B, and such that the direction of the magnetic flux φ200, which is generated by the current i2 flowing through the fourth winding 61B and passes through the third straight portion 51B, is the same as the direction of the magnetic flux φ4, which is generated by the current i2 flowing through the second winding 61A and passes through the second straight portion 52A. The first coil 34A and the second coil 34B are arranged side by side such that the first core 50A and the second core 50B surround the same axis, and such that the current i2 flowing through the second winding 61A and the fourth winding 61B generates the annular magnetic flux φ200, which passes through both of the second straight portion 52A and the fourth straight portion 52B.

As described above, the current i1 flowing through the first winding 60A and the third winding 60B generates the annular magnetic flux φ100, which passes through both of the first straight portion 51A and the third straight portion 51B. The leakage magnetic fluxes φ3 and φ13, which are generated respectively from the first coil 34A and the second coil 34B, thus intensify each other. This generates mutual inductance. Also, the current i2 flowing through the second winding 61A and the fourth winding 61B generates the annular magnetic flux φ200, which passes through both of the second straight portion 52A and the fourth straight portion 52B. The leakage magnetic fluxes φ4 and φ14, which are generated respectively from the first coil 34A and the second coil 34B, thus intensify each other. This generates mutual inductance. The damping effect produced in each of the first conductor 70A and the second conductor 70B increases in proportion to the mutual inductance. Therefore, for example, as compared with a case in which the first coil 34A and the second coil 34B are disposed unthoughtfully, an excellent damping effect is produced, and the resonance peak generated by the low-pass filter circuit 36 is readily suppressed.

The first core 50A and the second core 50B do not necessarily need to have the same shape.

The first conductor 70A and the second conductor 70B do not necessarily need to have a shape of a rectangular tube, but may have a cylindrical shape.

The first conductor 70A and the second conductor 70B do not necessarily need to be made of copper foil, but may be made of aluminum foil, brass foil, foil of stainless steel, or the like.

The first conductor 70A and the second conductor 70B do not necessarily need to be formed by foils as long as the first conductor 70A and the second conductor 70B are annular. The first conductor 70A and the second conductor 70B may be made of relatively thick plates.

The first straight portion 51A, the second straight portion 52A, the third straight portion 51B, and the fourth straight portion 52B do not necessarily need to have a shape of a quadrangular prism, but may have a shape of a circular post. The shapes of the first straight portion 51A, the second straight portion 52A, the third straight portion 51B, and the fourth straight portion 52B are not particularly limited as long as these extend linearly.

For example, a part of the first winding 60A or a part of the second winding 61A may be wound around the first coupling portion 53A and the second coupling portion 54A. That is, the first winding 60A and the second winding 61A may be modified as long as at least a part of the first winding 60A is wound around the first straight portion 51A, and at least a part of the second winding 61A is wound around the second straight portion 52A.

For example, a part of the third winding 60B or a part of the fourth winding 61B may be wound around the third coupling portion 53B and the fourth coupling portion 54B. That is, the third winding 60B and the fourth winding 61B may be modified as long as at least a part of the third winding 60B is wound around the third straight portion 51B, and at least a part of the fourth winding 61B is wound around the fourth straight portion 52B.

The compression unit 18 is not limited to a scroll type, but may be any type. For example, the compression unit 18 may be a piston type or a vane type.

In the above-described embodiment, the motor-driven compressor 11 is used in the vehicle air conditioner 10. However, the motor-driven compressor 11 may be used in other apparatuses. For example, the motor-driven compressor 11 may be mounted on a fuel cell electric vehicle and use the compression unit 18 to compress air that is a fluid supplied to the fuel cell.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
a compression unit configured to compress a fluid;
an electric motor configured to drive the compression unit; and
an inverter device configured to drive the electric motor, wherein
the inverter device includes:
an inverter circuit configured to convert DC power to AC power; and
a noise reducing unit that is provided on an input side of the inverter circuit and is configured to reduce common-mode noise and normal-mode noise included in the DC power before the DC power is supplied to the inverter circuit,
the noise reducing unit includes:
common-mode choke coils; and
a smoothing capacitor that is included in a low-pass filter circuit together with the common-mode choke coils,
the common-mode choke coils include a first coil and a second coil, the first coil includes:
an annular first core;
a first winding wound around the first core;
a second winding that is wound around the first core at a position away from the first winding so as to face the first winding; and
an annular first conductor that extends over and surrounds the first winding and the second winding,
the first conductor includes two regions respectively covering two openings of a first hole inside the first core, the two regions being opposed to each other with the first hole between them,
the first core includes:
a first straight portion that extends linearly, at least a part of the first winding being wound around the first straight portion; and
a second straight portion that extends parallel with the first straight portion, at least a part of the second winding being wound around the second straight portion,
the second coil includes:
an annular second core;
a third winding wound around the second core;
a fourth winding that is wound around the second core at a position away from the third winding so as to face the third winding; and
an annular second conductor that extends over and surrounds the third winding and the fourth winding,
the second conductor includes two regions respectively covering two openings of a second hole inside the second core, the two regions being opposed to each other with the second hole between them,
the second core includes:
a third straight portion that extends linearly, at least a part of the third winding being wound around the third straight portion; and
a fourth straight portion that extends parallel with the third straight portion, at least a part of the fourth winding being wound around the fourth straight portion,
the first winding and the third winding are electrically connected to each other,
the second winding and the fourth winding are electrically connected to each other, and
the first coil and the second coil are arranged side by side such that a current flowing through the first winding and the third winding generates an annular magnetic flux that passes through both of the first straight portion and the third straight portion.

2. The motor-driven compressor according to claim 1, wherein the first coil and the second coil are arranged side by side such that the first straight portion and the third straight portion are arranged on a same straight line and the second straight portion and the fourth straight portion are arranged on a same straight line, and such that a current flowing through the second winding and the fourth winding generates an annular magnetic flux that passes through both of the second straight portion and the fourth straight portion.

3. The motor-driven compressor according to claim 1, wherein the first coil and the second coil are arranged side by side such that the first core and the second core surround a same axis, and such that a current flowing through the second winding and the fourth winding generates an annular magnetic flux that passes through both of the second straight portion and the fourth straight portion.

4. The motor-driven compressor according to claim 1, wherein the first coil and the second coil are arranged side by side such that the first straight portion, the second straight portion, the third straight portion, and the fourth straight portion are arranged in parallel.

5. The motor-driven compressor according to claim 1, wherein the first core and the second core have a same shape.

* * * * *